United States Patent [19]
Kawano et al.

[11] Patent Number: 4,870,638
[45] Date of Patent: Sep. 26, 1989

[54] REMOTE MAINTENANCE SYSTEM FOR A DIGITAL COMMUNICATION NETWORK

[75] Inventors: Hisao Kawano, Yokohama; Kunio Yamamoto, Kawasaki, both of Japan

[73] Assignee: Fujitsu Limited, Kawasaki, Japan

[21] Appl. No.: 155,573

[22] Filed: Feb. 12, 1988

[30] Foreign Application Priority Data

Feb. 17, 1987 [JP] Japan ................................. 62-33629

[51] Int. Cl.$^4$ .............................................. H04J 1/16
[52] U.S. Cl. ...................................... 370/13; 370/17; 371/7; 371/20.1
[58] Field of Search ............... 370/13, 17, 58; 379/12, 379/31, 32; 371/22

[56] References Cited
U.S. PATENT DOCUMENTS 4,273,955  6/1981  Armstrong ............................ 370/13
4,575,839  3/1986  Ogawa et al. ......................... 370/13

Primary Examiner—Robert L. Griffin
Assistant Examiner—Frank M. Scutch, III
Attorney, Agent, or Firm—Staas & Halsey

[57] ABSTRACT

A remote maintenance system for a digital communication network, comprises local offices (LOs), at least two of which are grouped and connected to each other by a local line in the group, and a centralized maintenance and operation center (CMOC) located at a tandem office and connected to each LO by an ordinary digital transmission line (DTL) using the No. 7 Common Channel Signaling (CCS) system recommended by the CCITT. When a serious fault, such as system-down, occurs in a first LO in the group, a serious alarm signal is sent from the first LO to the CMOC through the local line, a second LO in the group and the DTL connecting the second LO and the CMOC, so that maintenance data for repairing the serious fault are provided at the CMOC and sent, under the No. 7 CCS system, to the first LO through the DTL toward the first LO. The maintenance data is sent without using a local switching network in the first LO, and can be sent through the DTL toward the second LO, the second LO and the local line to the first LO.

18 Claims, 11 Drawing Sheets

REMOTE MAINTENANCE SYSTEM FOR A DIGITAL COMMUNICATION NETWORK

BACKGROUND OF THE INVENTION

1. Field of the Invention

The present invention relates to a remote maintenance system for a digital communication network consisting of a plurality of digital switching offices.

2. Description of the Related Art

A digital communication network comprises a plurality of local switching offices (LOs) and a toll center (TC). Recently, the maintenance of equipment at each LO has remotely executed at a centralized maintenance and operation center (CMOC) located at the TC. The maintenance system of thus using the CMOC will be called a remote maintenance system hereinafter. The CMOC has two functions: a maintenance function and an operation function. The operation function is for the administration of the network, such as setting or changing subscribers only the maintenance function at the CMOC will be discussed in this disclosure.

As one of the remote maintenance systems of the prior art, a first remote maintenance system of the prior art will be discussed referring to FIGS. 1 and 2. In FIGS. 1 and 2, the supervisory information at each LO 1 is sent to the CMOC 3 through an exclusive data line (DL) 41 provided independently from a digital transmission line (DTL) 51 for ordinary communication in the digital communication network. As shown in FIG. 2, in the prior art, the operating status data and alarm data at the LO are gathered at an alarm unit (ALM) 10. Then, these data are sent to a data sending unit (SND) 16 through a bus line 100 in the LO 1 and are sent to the CMOC 3 through the DL 41.

The data for the operating status and alarm sent from the LO 1 are received at a data receiving unit (RCV) 36 in the CMOC 3. Then, in the CMOC 3, the data received at the RCV 36 are processed by a main processor (MPR) 31, displayed on a visual display unit (VDU) 351 of a system control work station (SCWS) 35, and stored in a memory means such as a magnetic tape (MT) 34. When a fault occurs in the LO 1, the existence of the fault is signalled by an alarm indicator or buzzer, which are not depicted in FIG. 2, to an operator at the CMOC 3. Then, the operator at the CMOC 3 investigates the fault by observing the visual display unit (VDU) 351 of the SCWS 35. The operator then informs an operator stationed at the LO1 how to repair the fault by, for example, telephone, using the digital communication network.

When the operator at the LO 1 receives the maintenance information for repairing the fault from the operator at the CMOC 3, the operator at the LO 1 repairs the fault at the LO 1 in accordance with the maintenance information from the operator at the CMOC 3. The operator at the LO 1 executes the maintenance to the system in accordance with the maintenance information by observing a VDU 151 and operating an operating console 152 of a SCWS 15 at the LO 1.

Thus, in the first remote maintenance system of the prior art, the data of the operating status and alarm at the LOs 1 are remotely supervised at the CMOC 3. However, the operator at the CMOC 3 must call the operator at the LO 1 to inform the LO operator how to repair the fault and an LO operator must always be stationed at each LO 1 for executing the maintenance. Further, a memory such as a magnetic tape (MT) 14 also must be provided at the LO 1 for, e.g. initial programming in response to a serious fault, such as a system-down in the LO 1. The system-down is a system problem wherein the switching operation ceases due to a hardware problem of the switching network or a software problem in the main processor. These hardware problems most occur because of a problem of the software for the main processor. Previously considering the occurrence of such system-down, the MT 14 is provided for storing an initial loading program used for normally restarting the switching network and/or main processor. Reference symbols DTs 13 and 33 in FIG. 2 indicate digital terminals of the DL 51 provided between the LO 1 and the CMOC 3.

To improve the above problem of the first remote maintenance system of the prior art, there is a second remote maintenance system of the prior art as shown in FIGS. 3 and 4. In FIGS. 3 and 4, the same numerals and symbols as in FIGS. 1 and 2 designate the same units or functions as in FIGS. 1 and 2. In the second remote maintenance system of the prior art, maintenance data from the CMOC 3 are also sent to respective LOs 1 through an exclusive data line. In FIG. 3, a one dot chain line having reference numeral 42 indicates a data line through which the data are transmitted in both ways between each LO 1 and the CMOC 3. As shown in FIG. 4, the maintenance data from the CMOC 3 is transferred to the LO 1 through a second DL 422. That is, when a fault occurs in the LO 1, the operator at the CMOC 3 provides the maintenance data for the LO 1 by operating an operating console 352 while observing a VDU 351 of a SCWS 35. The maintenance data entered made by the operator at the CMOC 3 is sent from a data sending unit (SND) 37 in the CMOC 3 to an RCV 17 in the LO 1 through the DL 422.

The second remote maintenance system of the prior art has the following merits compared with the first remote maintenance system of the prior art: (1) there is no need to use the telephone to send the maintenance data from the CMOC 3 to the LO 1; second, (2) there is no need to have the operator always standing by at the LO 1; and (3) there is no need to provide the MT 14 at the LO 1 because the initial loading to overcome the system-down can be executed by the maintenance data sent from the CMOC 3 through the DL 422. In the above, merits (2) and (3) particularly contribute to reducing the maintenance costs for the network. However, the second remote maintenance system has a drawback in that two exclusive data lines (DLs) 41 and 422 are necessary, which causes an increase in the facility costs and the running costs.

As far as reducing the cost for the exclusive data line, there is a third remote maintenance system of the prior art, which uses the DTL 51 for transferring the operating status and alarm data from the LO 1 to the CMOC 3. This system has been disclosed in U.S. Pat. No. 4,575,839 to Yusuke Ogata et al. entitled "CENTRALIZED SUPERVISORY SYSTEM" which issued Mar. 11, 1986. FIGS. 5 and 6 illustrate the system of Ogata as the third remote maintenance system of the prior art. According to the third system of the prior art of Ogata, the operating status and alarm data from the LO 1 to the CMOC 3 are transferred through some channels of the DTL 51. The DTL 51 transfers the data under a pulse code modulation (PCM) system. One dot chain lines 43 in FIGS. 5 and 6 indicate the channels. In FIG. 6, the operating status and the alarm information in LO 1 are gathered at the ALM 10, and the data of the information are created at the ALM 10 and sent to a common channel signaling equipment (CSE) 18 through a bus line 100. Then, the data are sent, under an ordinary common channel signaling system, to a local digital switching 12 network (NW). through an interface unit (INT) 19. Wherein, the ordinary common channel signaling system is, as is well known, the very peculiar system used in the recent digital switching system. Thus, the operating status and alarm data are sent to the CMOC 3 through the NW 12 and the DT 13 in the LO 1 and the DTL 51 by using the channels 43. In the CMOC 3, the operating status and alarm data are sent to the MPR 31 through an NW 32, an INT 39 and a CSE 38, and processed in the MPR 31 so that the operating status and alarm data are stored in the MT 34 and displayed on a VDU in the SCWS 35. The INT 39 is an interface between the NW 32 and the CSE 38, and the CSE 38 is for sending data and signals under the common channel signaling system.

In the Ogata system, the exclusive data line becomes unnecessary to transmit the operating status and alarm data from the LO to the CMOC. However, the maintenance data from CMOC 3 to the LO 1 cannot be transmitted through the DTL 51. Accordingly, an operator must be stationed at the LO 1 and the MT 14 also must be provided at the LO 1, which is functionally similar to the case of the first remote maintenance system of the prior art.

SUMMARY OF THE INVENTION

Therefore, an object of the present invention is to reduce the numbers of operators at local offices of a digital communication network having a remote maintenance system, for reducing personnel expenses.

Another object of the present invention is to exclude the exclusive data line for transmitting the alarm data and the maintenance data between each local office (LO) and the centralized maintenance and operation center (CMOC) of the remote maintenance system, for reducing the facilities costs of the network.

Still another object of the present invention is to exclude the data storing means such as a magnetic tape unit to store the program for the initial loading, from each LO, for reducing the facilities costs in each LO and the running costs thereof.

Still more another object of the present invention is to execute maintenance for the serious faults, such as the system-down in the LO, without the operator and the data storing means at the LO.

Still another object of the present invention is to make the CMOC acknowledge which LO has the serious fault when the LO having the serious fault is located far from the CMOC through many tandem offices.

The above objects of the present invention are achieved by performing the following steps, (1) transmitting the operating status and alarm data from each LO to the CMOC through an ordinary digital transmission line (DTL); (2) transmitting maintenance data from the CMOC to each LO through the DTL; (3) applying the No. 7 Common Channel Signaling System (CCS) recommended by International Telegraph and Telephone Consultative Committee (CCITT) to the transmission of the alarm and the maintenance data between each LO and the CMOC; (4) grouping all LOs into several groups so that each group has more than two LOs; and (5) providing local exclusive data lines among the LOs in each group for executing a backup to each other when one of the LOs in the group has a serious fault.

In accordance with the above steps (1) and (2), the personnel expenses and the facilities costs at the LO can be reduced. In accordance with the above step (3), the transmission of the alarm data from the LO to the CMOC and of the maintenance data from the CMOC to the LO can be made easily, and the location of the LO having the serious fault can be easily found. Particularly, when there are tandem offices between the LO and the CMOC as shown in FIG. 10, the transmission can be made easily, and the location of the LO having the serious fault can be found easily. And, in accordance with the above steps (4) and (5), the maintenance of the serious faults, such as the system-down at the LO, can be executed without the operator and the data storing means at the LO. This is because when a serious fault, such as system-down, occurs at a first LO in the group, the switching network at the first LO cannot be used, so that the data transmission through the DTL between the first LO and the CMOC becomes impossible to be executed. In this case, the alarm data at the first LO can be transmitted to the CMOC through the local exclusive data line, a second LO connected to the first LO by the local exclusive data line, and the DTL between the second LO and the CMOC.

DESCRIPTION OF THE PREFERRED EMBODIMENTS

Figure 1:
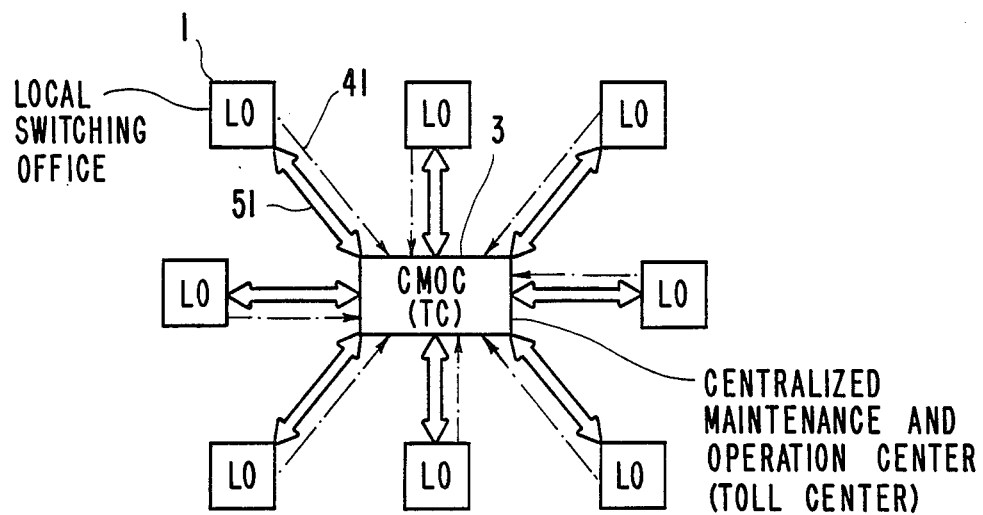
FIG. 1 is a block diagram of the first remote maintenance system of the prior art for illustrating the relationship between the LOs and the CMOC therein.
Figure 3:
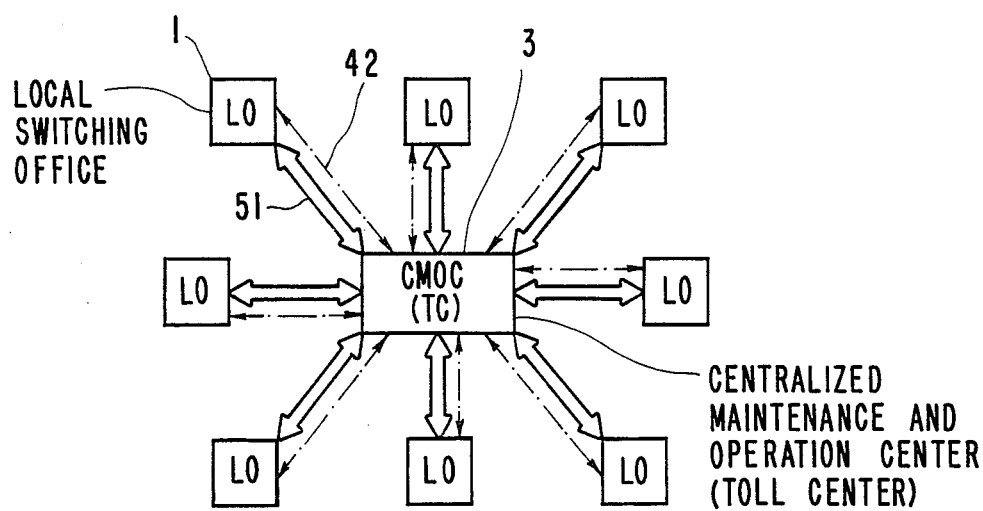
FIG. 3 is a block diagram of the second remote maintenance system of the prior art for illustrating the relationship between the LOs and the CMOC therein.
Figure 2:
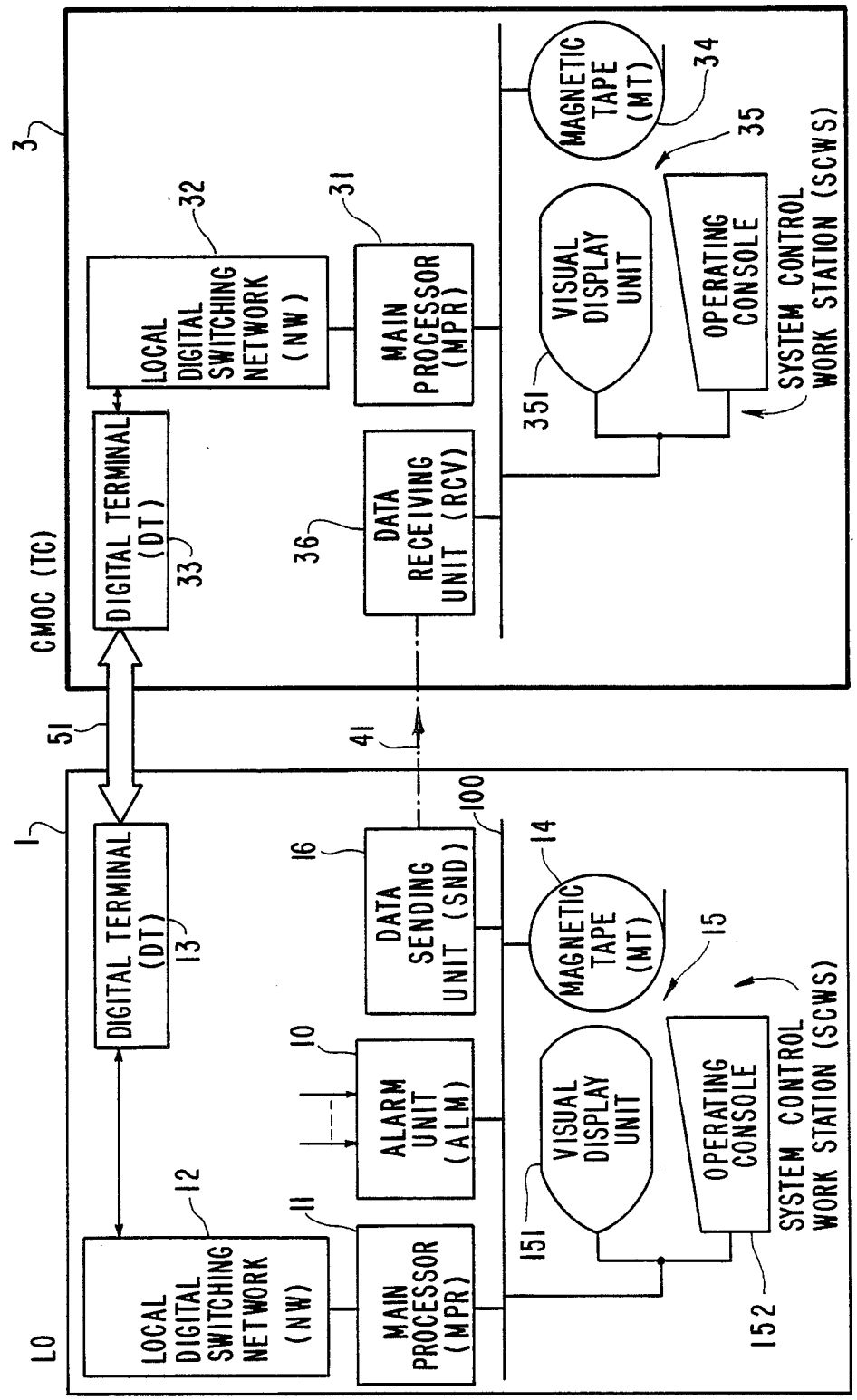
FIG. 2 is a block diagram of the first remote maintenance system of the prior art for illustrating the operational relationship between one LO and the CMOC.
Figure 4:
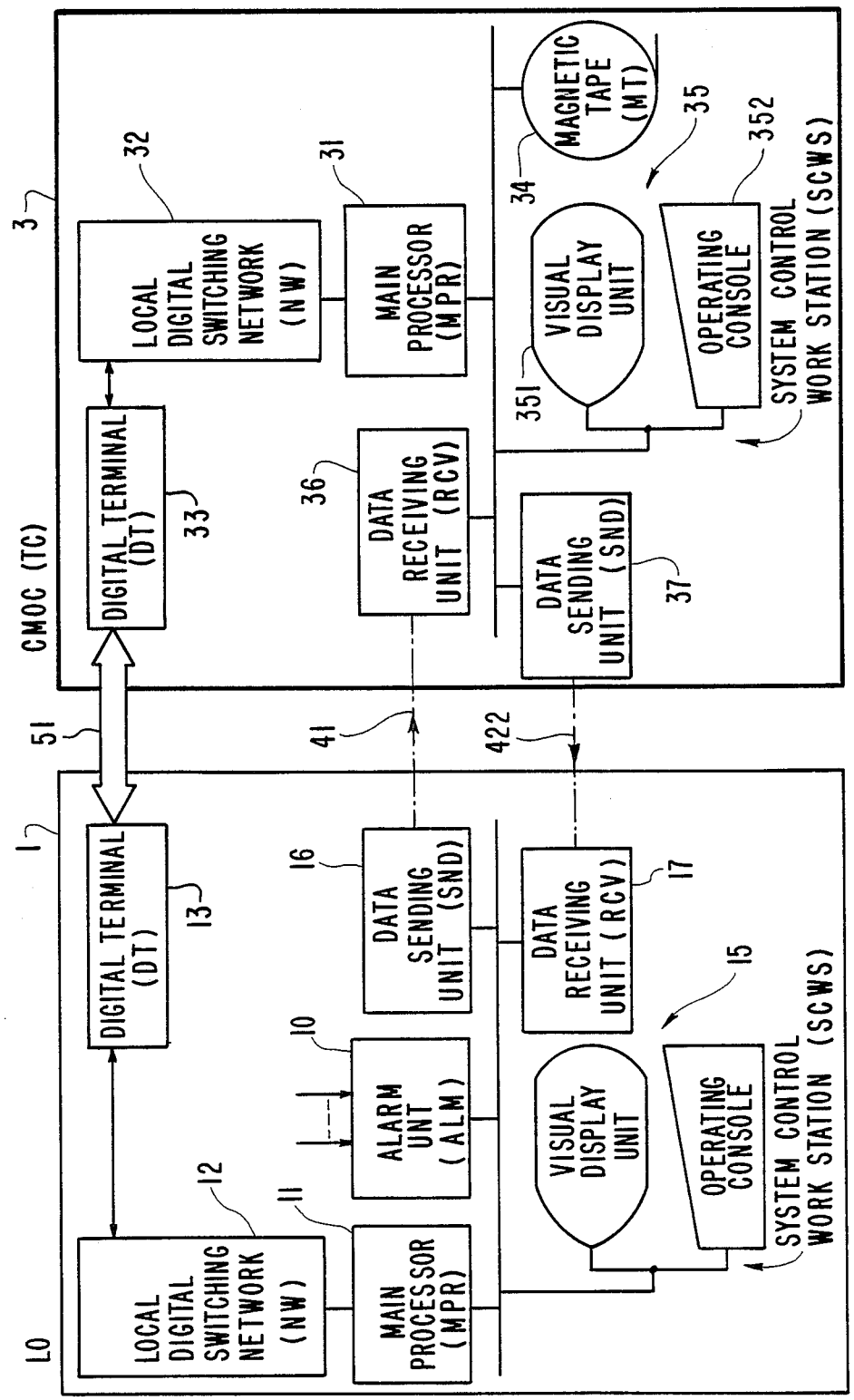
FIG. 4 is a block diagram of the second remote maintenance sytem of the prior art for illustrating the operational relationship between one LO and the CMOC.
Figure 5:
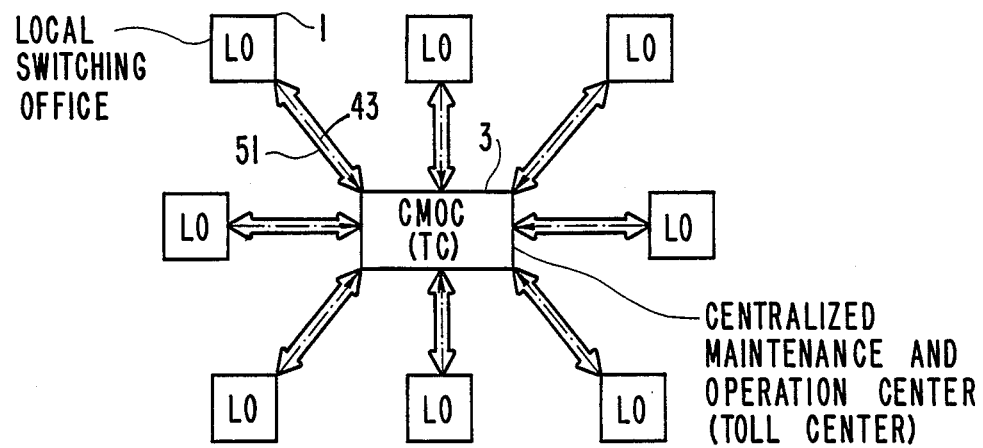
FIG. 5 is a block diagram of the third remote maintenance system of the prior art for illustrating the relationship between the LOs and the CMOC therein.
Figure 7:
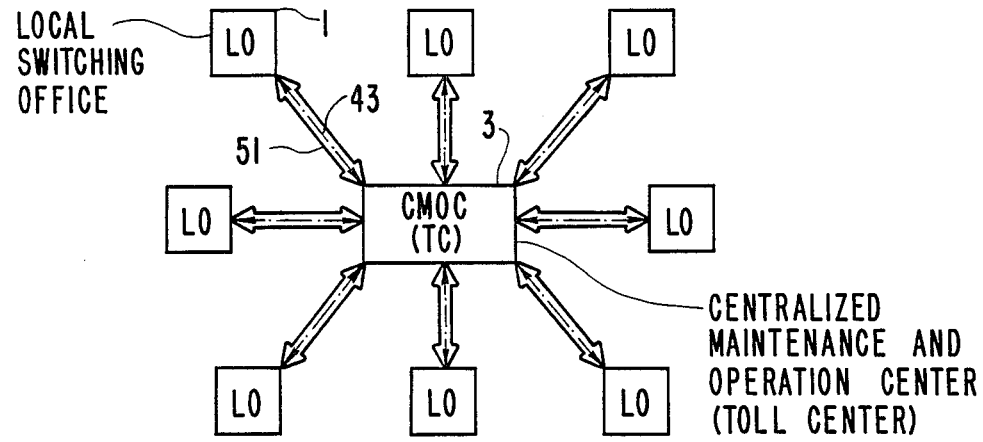
FIG. 7 is a block diagram of the fourth remote maintenance system of the prior art for illustrating the relationship between the LOs and the CMOC therein.
Figure 6:
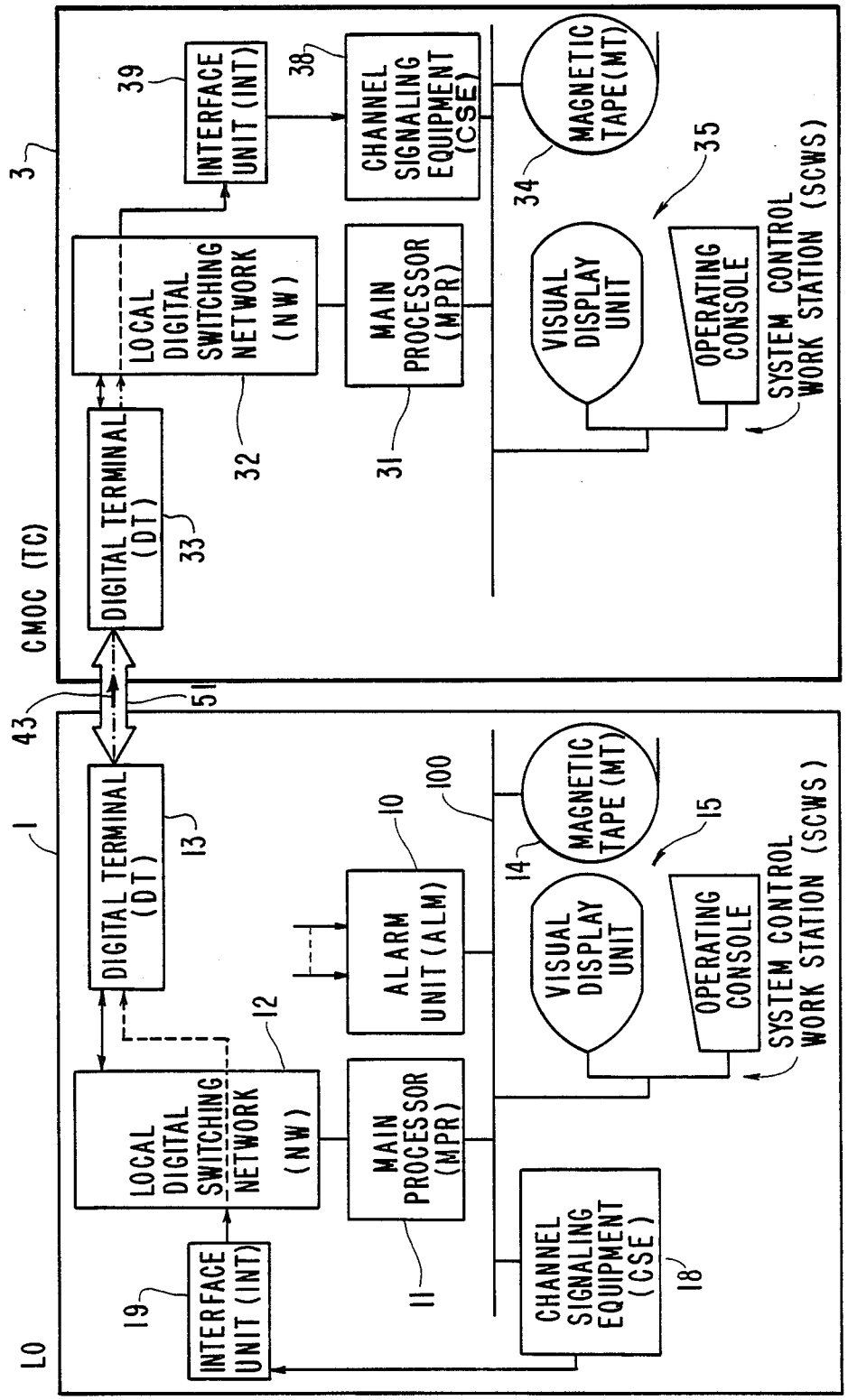
FIG. 6 is a block diagram of the third remote maintenance system of the prior art for illustrating the operational relationship between one LO and the CMOC.
Figure 8:
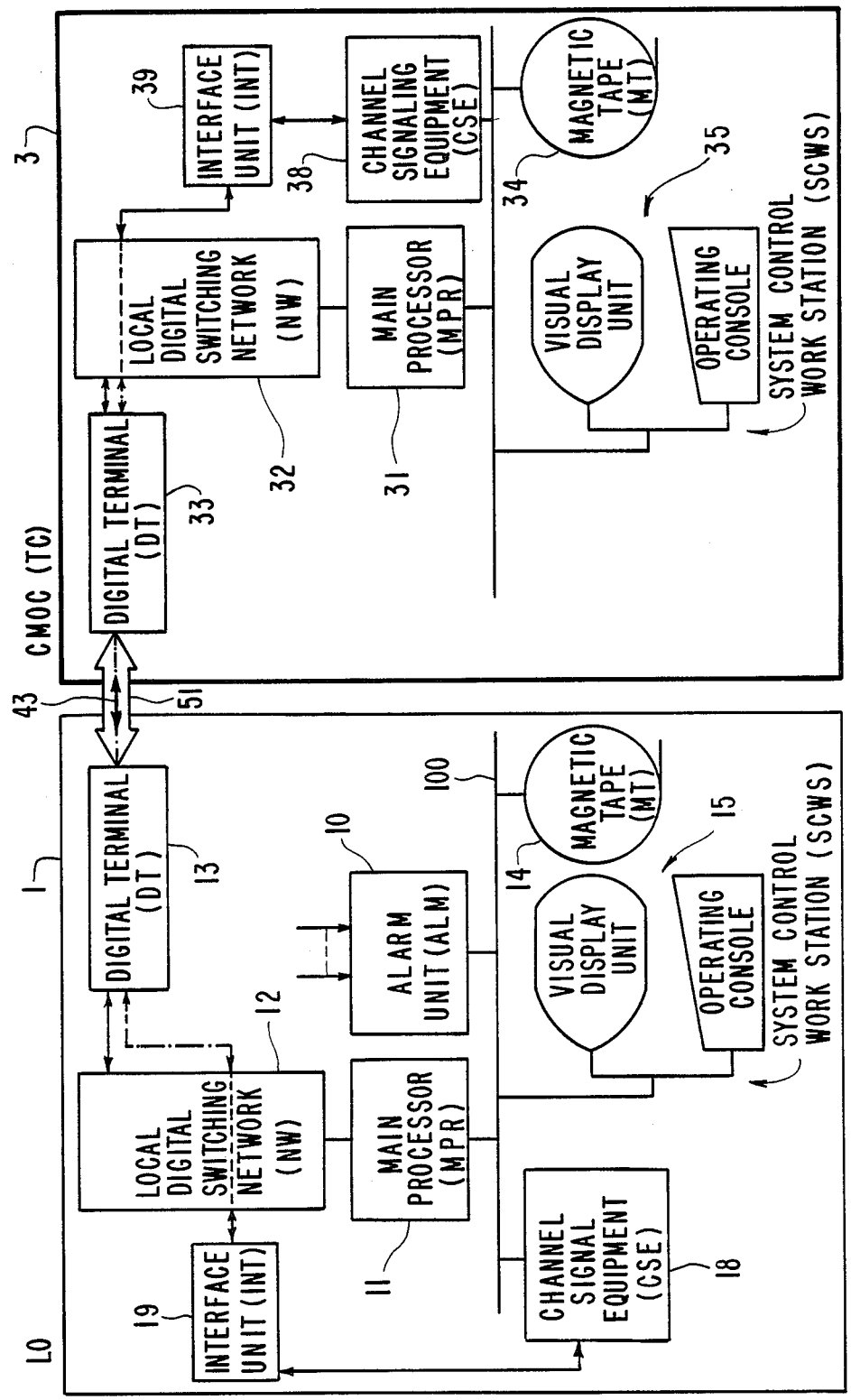
FIG. 8 is a block diagram of the fourth remote maintenance system of the prior art for illustrating the operational relationship between one LO and the CMOC.

The expenses incurred by the use of two exclusive data lines, such as DLs 41 and 422 in FIG. 4, can be reduced to zero by transmitting not only the alarm data from an LO 1 to a CMOC 3 but also the maintenance data from the CMOC 3 to the LO 1 through a DTL 51 as shown a fourth remote maintenance system of the prior art in FIGS. 7 and 8. (In FIGS. 7 and 8, the same reference numerals and symbols as in FIGS. 5 and 6 designate the same units or function as in FIGS. 5 and 6.) In FIGS. 7 and 8, reference numeral 43 indicates the data transmission with which the alarm data and the maintenance data can be transmitted in both ways between the LO 1 and the CMOC 3. However, in a network having such a remote maintenance system as shown in FIGS. 7 and 8, the network could not execute maintenance for a serious fault such as system-down. As an NW 12 in the LO 1 cannot be used when the system is down, the alarm and maintenance data cannot be transmitted between the LO 1 and the CMOC 3.

Figure 9:
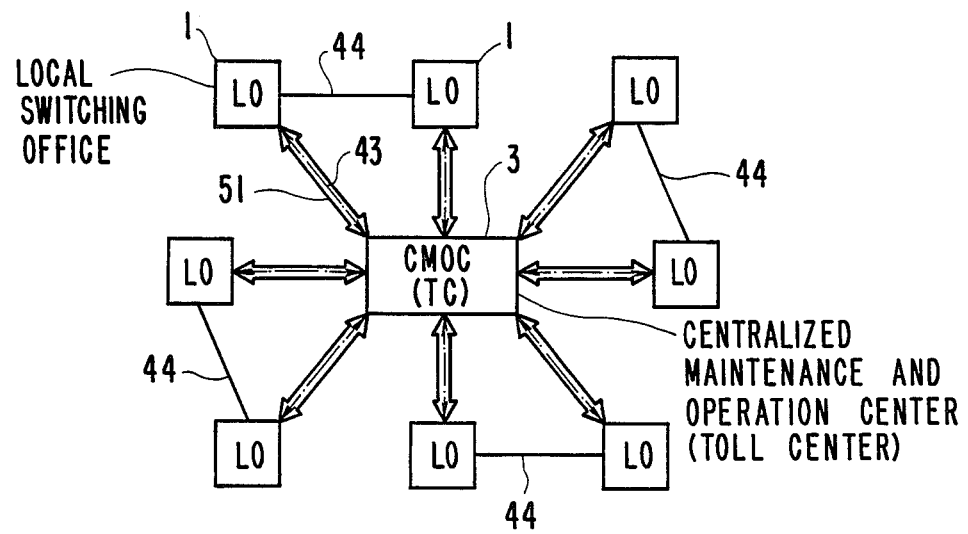
FIG. 9 is a block diagram of a remote maintenance system of the present invention for illustrating the relationship between the grouped LOs and the CMOC therein.
Figure 11:
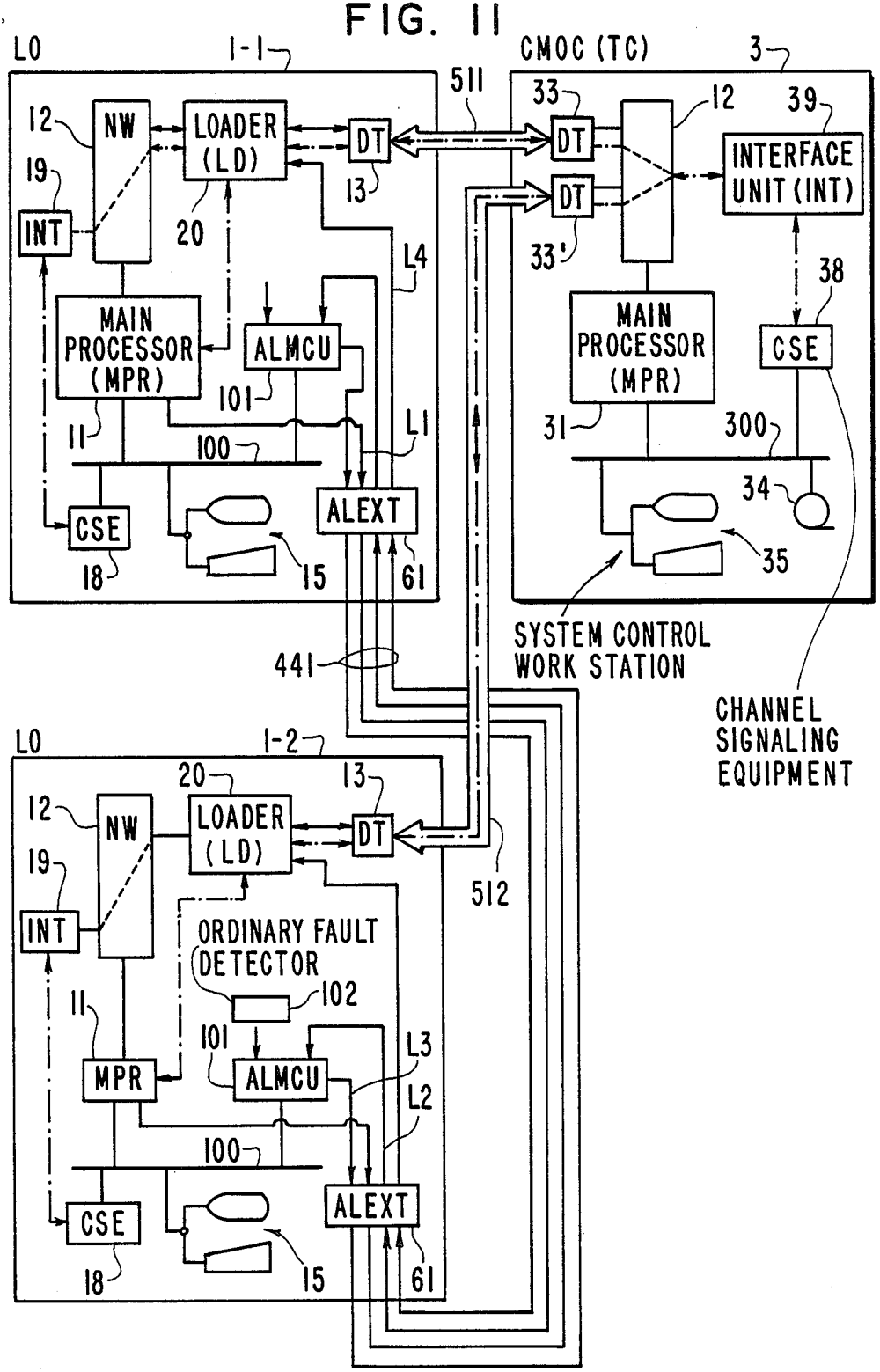
FIG. 11 is a block diagram of a first remote maintenance system embodying the present invention for illustrating the relationship between the grouped LOs connected by an LDL and the CMOC.
Figure 12:
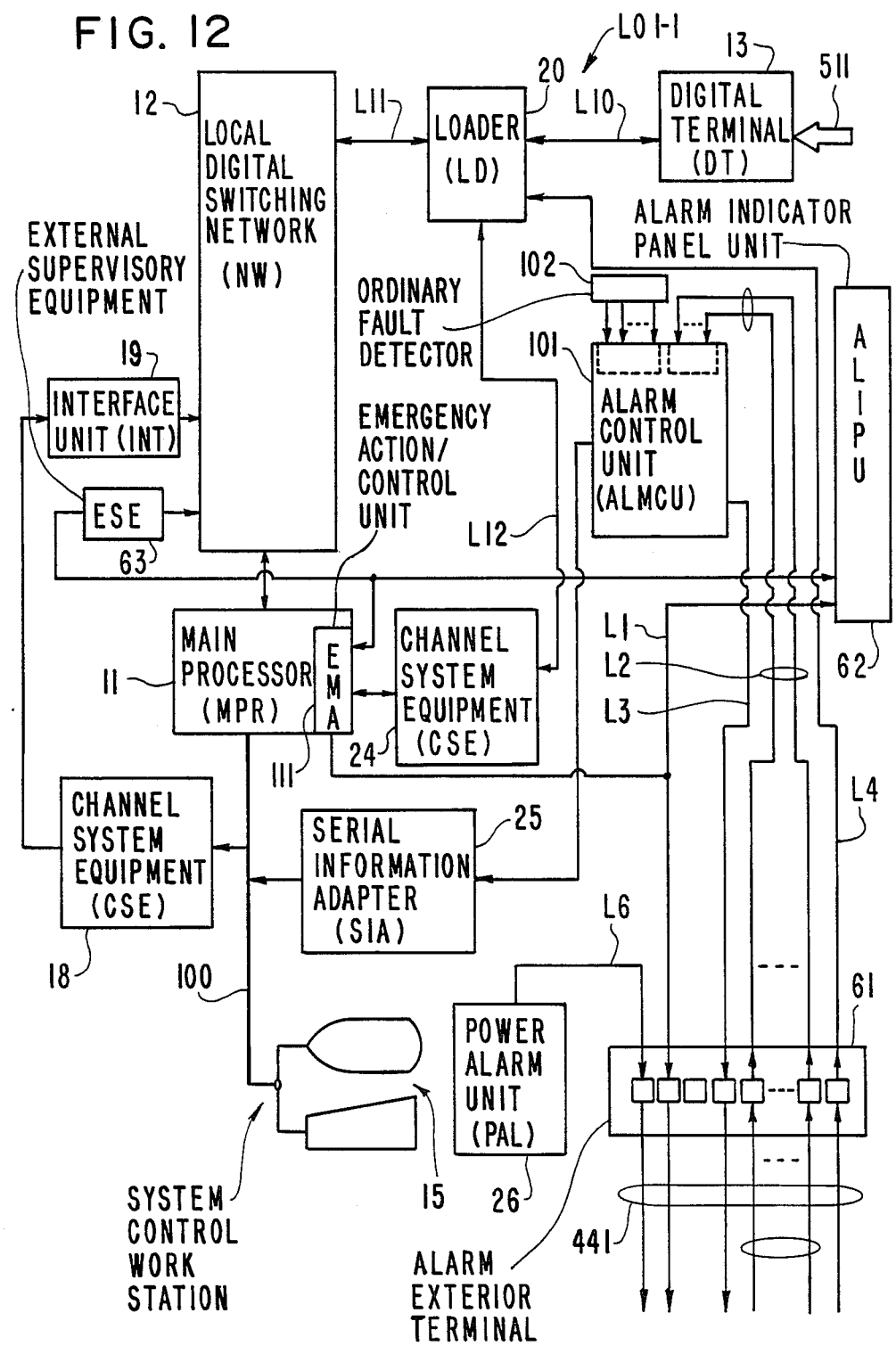
FIG. 12 is a block diagram of one LO in the grouped LOs in the first remote maintenance system embodying the present invention.

The above problem in the remote maintenance system shown in FIGS. 7 and 8 can be solved by remote maintenance systems embodying the present invention, shown in FIG. 9. (In FIG. 9, the same reference nemerals and symbols as in FIG. 7 designate the same offices and functions as in FIG. 7.) The remote maintenance systems embodying the present invention include a first system and a second system. FIGS. 11 and 12 and FIGS. 13 and 14 illustrate the first and the second systems respectively. In FIGS. 11 and 12, the same numerals or symbols as in FIGS. 7 and 8 designate the same units or function as in FIGS. 7 and 8, and in FIGS. 13 and 14, the same numerals or symbols as in FIGS. 11 and 12 designates the same units or functions as in FIG. 11 and 12.

Figure 10:
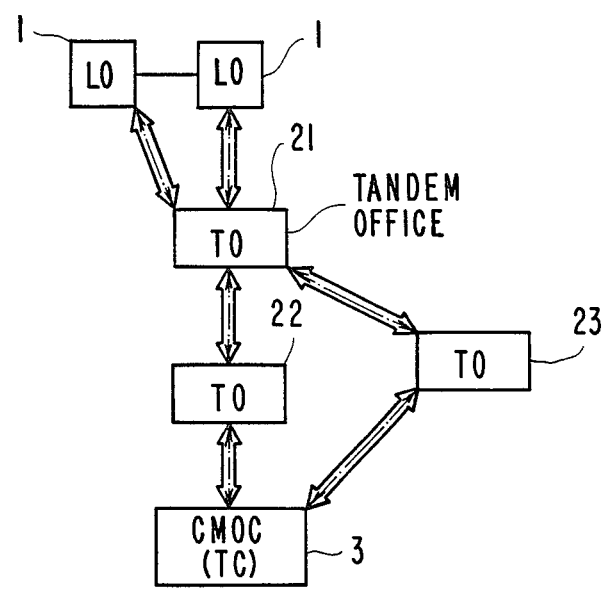
FIG. 10 is a block diagram of the remote maintenance system of the present invention for illustrating the data and signal transmission route when there are many tandem offices between the grouped LOs and the CMOC therein.

As shown in FIGS. 9 and 10, in the first remote maintenance systems embodying the present invention, the alarm and the maintenance data are usually transmitted between each LO and the CMOC respectively by using the DTLs 51, which is similar to the system in FIGS. 7 and 8. However, the systems embodying the present invention differ from the system in FIGS. 7 and 8, in that the LOs respectively connected to the CMOC through the DTL 51 are grouped so that each group includes two (or more) LOs, and in each group, the two LOs (or two LOs adjacent to each other in case that more than two LOs are grouped) are connected by a local data line (LDL) 44 as shown in FIG. 9. This connection by the LDL 44 is for providing a backup when a serious fault, such as system-down, occurs at one of the grouped LOs. For instance, when an LO (a first LO) has the serious fault, another LO (a second LO) connected with the first LO provides a backup to the first LO. The second LO transmits the fault information from the first LO to the CMOC and the maintenance information from the CMOC to the first LO by using the switching function of the second LO.

In the remote maintenance systems embodying the present invention, the difference between the first system and the second system is as follows. In the first system, when a serious fault occurs at the first LO, the maintenance data re transmitted from the CMOC to the first LO are through the DTL 51 (first DTL) between the first LO and the CMOC, and the LDL 44 is used for transmitting the alarm information from the first LO to the CMOC. In the second system, when the serious fault occurs at the first LO, not only the alarm information from the first LO, but also the maintenance data from the CMOC to the first LO are transmitted through the DTL 51 connecting the second LO and the CMOCand LDL 44.

Figure 13:
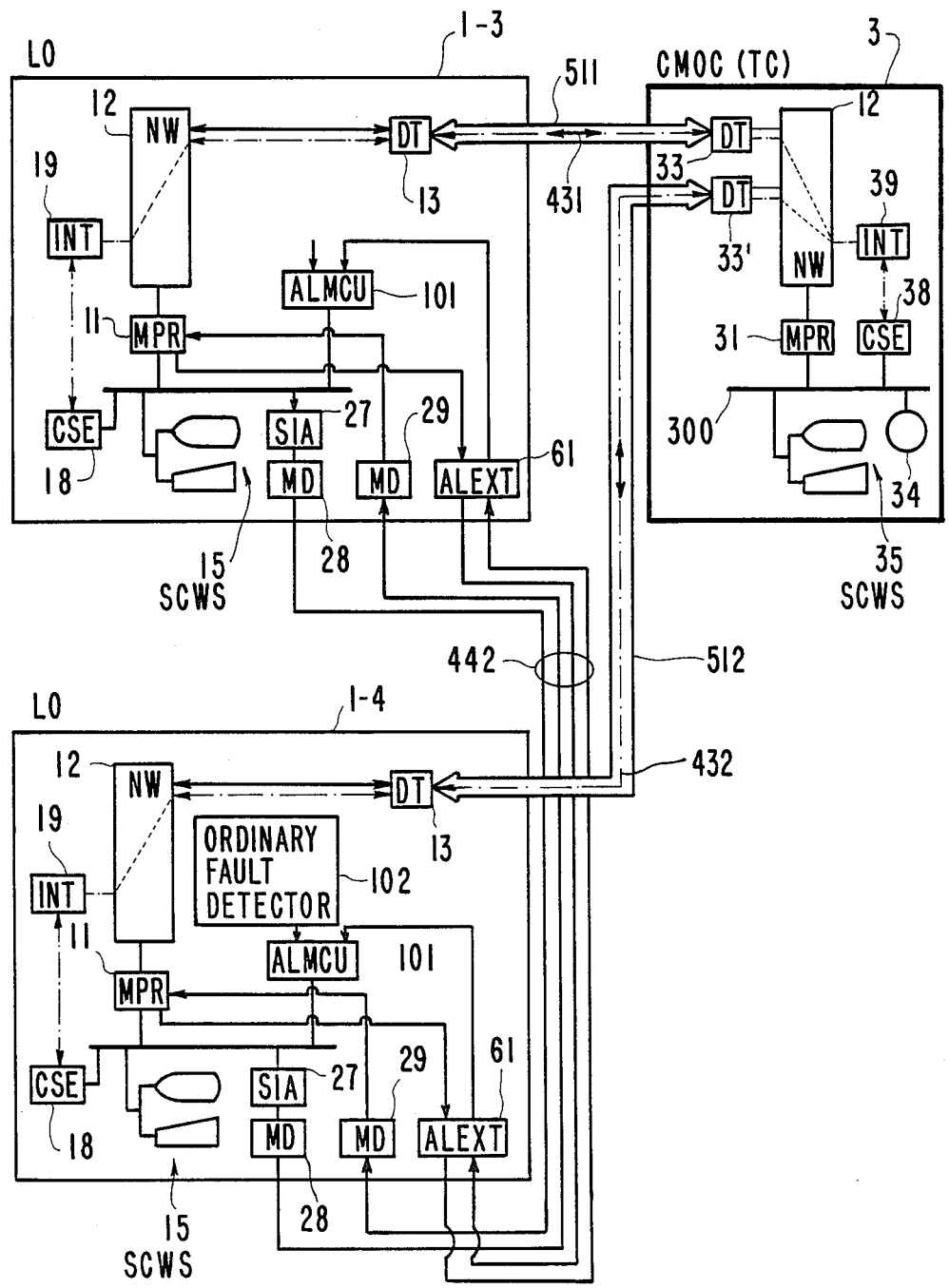
FIG. 13 is a block diagram of a second remote maintenance system embodying the present invention for illustrating the relationship between the grouped LOs connected by an LDL and the CMOC therein.
Figure 14:
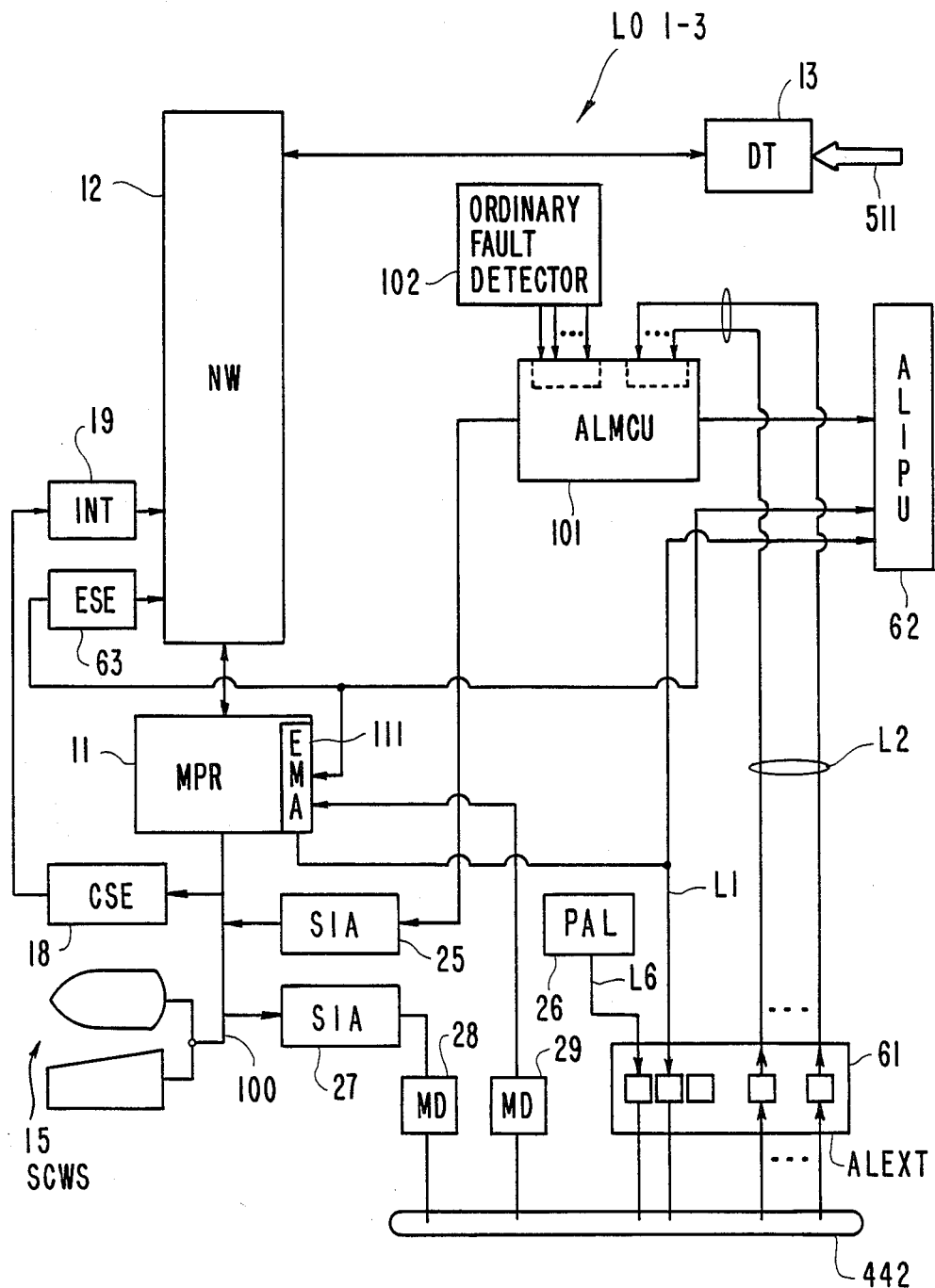
FIG. 14 is a block diagram of one LO in the grouped LOs in the second remote maintenance system embodying the present invention.

In the first and second remote maintenance systems embodying the present invention, two LOs are grouped; that is, in the first system shown in FIGS. 11 and 12, LOs 1-1 and 1-2 are grouped, and in the second system shown in FIGS. 13 and 14, LOs 1-3 and 1-4 are grouped. FIGS. 11 and 13 illustrate the relationship of the data link among the grouped LOs and the CMOC, and FIGS. 12 and 14 illustrate the details of one of the grouped LOs from the first and second embodiments, respectively. Thus grouping the LOs and providing the LDL among the LOs in the group are a first point of the present invention. A second point of the present invention is to use No. 7 CCS for transmitting the alarm information and the maintenance data through the switching network in the backup LO and the DTL connecting the backup LO to the CMOC. As explained before, by applying the No. 7 CCS, these data transmissions in the centralized maintenance system becomes very simple, even though tandem offices (TOs) exist on the way of a route from an LO 1 to the CMOC 3 as shown in FIG. 10. In FIG. 10, reference numerals 21, 22 and 23 indicate the TOs, and other numerals and symbols designate the same offices and functions as in FIG. 9. In FIG. 10, if the transmission route for the alarm and maintenance data through the TO 22 is occupied by other transmitting signals, the data can be transmitted through the TO 23, due to the No. 7 CCS system being used.

FIGS. 11 and 12 illustrate the first remote maintenance system embodying the present invention. FIG. 11 illustrates the relationship between the grouped LOs and the CMOC, and the FIG. 12 illustrates the details of one of the grouped LOs (LO1-1) in FIG. 11. In FIGS. 11 and 12, the same reference numerals as in FIG. 8 designates the same units or functions as in FIG. 8.

In FIG. 11, the supervisory data and the ordinary alarm signal in a first LO (LO 1-1) and a second LO (LO 1-2) are sent to the CMOC 3 through the DTLs 511 and 512 with the operation of the NWs 12 in the LOs 1-2, and 1-2 respectively. However, when a serious fault occurs, for example, in the LO 1-1, a serious alarm signal, which is a ground signal for indicating that the serious fault has occured in the LO, is outputted from the MPR 11 in the LO 1-1. However, because of the serious fault, the NW 12 in the LO 1-1 cannot be used. Accordingly, in the first system embodying the present invention, the serious alarm signal is sent to the LO 1-2 through the LDL 441. Then the LO 1-2 sends the serious alarm signal to the CMOC through the DTL 512 and at the same time controls the LO 1-1 so that the maintenance data sent from the CMOC 3 for repairing the serious fault in the LO 1-1 can be received without using the NW 12 in the LO 1-1. To achieve the above, an alarm control unit (ALMCU) 101 and a loader (LD) 20 are newly provided in each LO.

FIG. 12 illustrates the detail function in the LO 1-1. In FIG. 12, supervisory information and ordinary fault information, which are obtained by an ordinary fault detector 102, are sent to the ALMCU 101 which is controlled the MPR 11 so that the ordinary alarm signal is sent to a CSE 18 through a serial information adapter (SIA) 25 and the bus line 100. The supervisory information and the ordinary alarm signal are modified at the SIA 25 so as to be sent to the CMOC under the No. 7 CCS system through the INT 19 and the NW 12 by the operation of the MPR 11, and through the LD 20, the DT 13 and the DTL 511. The maintenance data for repairing the ordinary fault in the LO 1-1 are provided by the operator at the CMOC and are sent to the LO 1-1 through the DTL 511. The maintenance data arriving at the LO 1-1 are fed to the NW 12 through the DT 13 and the LD 20 and sent to the CSE 18. The maintenance data sent from the CMOC under the No. 7 CCS system are changed to regular data at the CSE 18 and sent to the MPR 11, in which the ordinary fault is repaired.

When a serious fault such as system-down occurs in the LO 1-1, the MPR 11 and the NW 12 in the LO 1-1 cannot be used. However, in this case, a serious alarm signal due to the serious fault is sent from an emergency action/control unit (EMA) 111 in the MPR 11 to an alarm exterior terminal (ALEXT) 61 through a line L1 in the LO 1-1. The serious alarm signal from the EMA 111 will be called a "first alarm signal" hereinafter. The first alarm signal is also sent to an alarm indicator panel unit (ALIPU) 62 in the LO 1-1 by which the occurrence of the serious fault is indicated. As shown in FIG. 11, the first alarm signal from the ALEXT 61 in the LO 1-1 is sent to the ALEXT 61 in the LO 1-2 through the LDL 441. The LO 1-2 has the same construction and function as those of the LO 1-1. The first alarm signal arriving at the ALEXT 61 in the LO 1-2 is fed to the ALMCU 101 in the LO 1-2 along a line L2 as shown in the LO 1-2 in FIG. 11. As LO 1-2 is identical to LO 1-1 of FIG. 12, the details of the above may be discerned in view of FIG. 12. In FIG. 12, the L2 consists of a plurality of lines, which means that the L2 can handle other serious alarm signals, which will be discussed later. When the ALMCU 101 in the LO 1-2 receives the first alarm signal, the ALMCU 101 outputs an LD control signal and sends it to the ALEXT 61 in the LO 1-2 through a line L3. The LD control signal passing through the ALEXT 61 in the LO 1-2 is sent to the ALEXT 61 in the LO 1-1 through the LDL 441 as shown in FIG. 11. The LD control signal passing through the ALEXT 61 in the LO 1-1 is fed to the LD 20 through a line L4. Then the LD 20 operates so that the connection from the DTL 511 to the NW 12 through the DT 13 is changed toward the EMA 111 in the MPR 11 through a CSE 24 through a line L12. More precisely, a route L10–L11 is changed to a route L10–L12; wherein, the L10 is a line connecting the DT 13 with the LD 20, the L11 is a line connecting the LD 20 with the NW 12 and the L12 is a line connecting the LD 20 with the CSE 24, as shown in FIG. 12.

The first alarm signal from the EMA 111 is a simple ON-OFF signal, which is usually called a "ground signal", for only alarming that a serious fault has occurred in the LO 1-1. Therefore, the detail data of the serious fault cannot be sent to the CMOC 3 by the first alarm signal. However, when the LD 20 operates so as to open the route L10–L12, the serious alarm data can be sent from the EMA 111 to the CMOC through the route L12–L10 and the DTL 511, so that the serious fault in the LO 1-1 can be analyzed by the operator at the CMOC 3, and the maintenance data for repairing the serious fault can be sent back to the EMA 111 in the LO 1-1 through the same route as the route through which the serious alarm data have been sent to the CMOC 3 from the LO 1-1.

In the above explanation, the serious fault is mainly due to a problem in the software for operating the MPR 11. The EMA 111 is a unit for automatically detecting the fault in the MPR 11, and primarily sending the first alarm signal and secondly sending the serious alarm data in the LO 1-1 to the CMOC 3. In the recent switching offices, there are many means for automatically supervising the state of the switching operation. For example, an external supervisory equipment (ESE) 63 is one of the supervisory means. The ESE 63 is for automatically supervising the operation of the NW 12 including the operation of the MPR 11. The output from the ESE 63, which is a serious fault signal and will be called a second alarm signal hereinafter, is fed to the EMA 111. The second alarm signal is also sent to the ALIPU 62 for indicating that there is the second alarm signal in the LO 1-1.

In the above explanation, the first and second alarm signals relate to a system-down problem due to the MPR 111 and/or the NW 12; however, the system-down also occurs due to a power-down condition in the LO 1-1. A power alarm unit (PAL) 26 detects the power-down condition and procedures a third alarm signal when the power-down conditions occurs. The third alarm signal is sent to the ALEXT 61 through a line L6 and also sent to the ALEXT 61 in the LO 1-2 through the LDL 441; wherein, in FIG. 11, the line for transmitting the third alarm signal is omitted in the LDL 441. Similarly to the case of the second alarm signal, the third alarm signal passes through the ALEXT 61 in the LO 1-2 and is fed to the ALMCU 101 through one line of the L2. However, in the case of the third alarm signal, the ALMCU 101 in the second LO 1-2 operates so that the third alarm signal is transmitted to the CMOC 3 through the SIA 25, the bus line 100, the CSE 18, the INT 19, the NW 12, the LD 20, the DT 13 (which are in the LO 1-2), and the DTL 512. The third alarm signal is generated when the power in the LO 1-1 is down, thus the LD 20 in the LO 1-1 cannot operate if the ALMCU 101 in the LO 1-2 were to send the LD control signal to the LD 20 via the ALEXT 61 in the LO 1-1. In the case of the third alarm signal, the remote maintenance cannot be executed because the power in the LO 1-1 is down, and an operator must be sent to the LO 1-1 for repairing a power supply system, which is not depicted in FIG. 12, in the LO 1-1.

As explained above, the serious alarm signals sent to the LO 1-2 from the LO 1-1 are all the simple ground signals. Therefore, simple conductors such as bare wires can be used in the LDL 441, which results in reducing the costs for the LDL 441. Of course, by using the first remote maintenance system embodying the present invention to a digital communication network, the costs of the lines for transmitting these alarm signals and also the maintenance data between the LO 1-1 and the CMOC 3 can also be reduced.

The second remote maintenance system embodying the present invention will be disclosed referring to FIGS. 13 and 14. FIG. 13 is for explaining the relationship of the connection between the grouped LOs (LO 1-3 and LO 1-4) and the CMOC 3. FIG. 14 illustrates the details of one of the grouped LOs, for example, the LO 1-3. Similarly to the case of FIGS. 11 and 12, the second remote maintenance system embodying the present invention will be discussed under the assumption that the serious fault occurs in the LO 1-3 and the LO 1-4 performs a backup function to the LO 1-3. The feature of the second remote maintenance system embodying the present invention is that a loader unit (LD) is not necessary and the DTL 511 between the LO 1-3 and the CMOC 3 is not used for transmitting the serious alarm data and the maintenance data between the LO 1-3 and the CMOC, as done in the first remote maintenance system. Instead of using an LD and the DTL 511, the serious alarm data from the LO 1-3 and the maintenance data from the CMOC 3 to the LO 1-3 are transmitted through the DTL 512 between the LO 1-4 and the CMOC 3, and through an LDL 442 between the LOs 1-3 and 1-4, as shown in FIG. 13.

When a serious fault, such as system-down, occurs in the LO 1-3, the first alarm signal from the EMA 111 is sent to the ALEXT 61 through the L1 in the LO 1-3. Then the first alarm signal from the ALEXT 61 in the LO 1-3 is sent to the ALMCU 101 in the LO 1-4 through the LDL 442, ALEXT 61 in the LO 1-4 and the L2 in the LO 1-4. This is the same as the case of the first remote maintenance system embodying the present invention. When the first alarm signal is fed to the ALMCU 101 in the LO 1-4, the ALMCU 101 in the LO 1-4 controls so that the serious alarm signal is sent to the CMOC 3 through the SIA 25, the bus line 100, the CSE 18, the INT 19, the NW 12, the DT 13 (which are in the LO 1-4), and DTL 512. Then, at the CMOC 3, the operator at the CMOC 3 investigates the serious alarm signal from the LO 1-3 and sends the maintenance data for remotely repairing the serious fault in the LO 1-3. However, in the second remote maintenance system embodying the present invention, the maintenance data from the CMOC 3 are not sent to the LO 1-3 using the DTL 511 as the first system, they are sent to the LO 1-3 through the DTL 512, the LO 1-4 and the LDL 442. That is, the maintenance data arriving at the LO 1-4 are sent to a modem (MD) 28 in the LO 1-4 through the DT 13, the NW 12, the INT 19, the CSE 18, the bus line 100 and the SIA 27 in the LO 1-4. The maintenance data from the MD 28 in the LO 1-4 are sent to the modem (MD) 29 in the LO 1-3 through a high quality transmission line such as a coaxial cable, in the LDL 442. The maintenance data arriving at the MD 29 in the LO 1-3 are sent to the EMA 111 in the MPR 11 in the LO 1-3 so as to repair the serious fault. As mentioned above, in the second remote maintenance system, the high quality transmission line is used in the LDL 442 instead of providing the LD 20 in each LO, as in the case of the first remote maintenance system.

When a serious fault, such as power-down, occurs in the second maintenance system, similarly to the case of the first remote maintenance system, the PAL 26 produces a third alarm signal which is sent to the ALMCU 101 in the LO 1-4, and the third alarm signal is sent to he CMOC 3 through the same route as that in the case of the first or second alarm signal. As stated in the explanation of the first remote maintenance system embodying the present invention, when the power-down occurs in the LO, an operator must be sent to the LO having a fault due to the power-down. However, when the operator executes the initial program loading, it is not required to provide an MT previously used in the LOs for storing the loading data in the LO because the loading data can be sent from the CMOC 3.

Usually, in a digital communication network consisting of a plurality of digital electronic switching offices, a serious fault usually occurs in the form of a system-down due to a fault in the MPR, including a fault of the software, and a power-down is rare. Therefore, by applying the first or second remote maintenance system embodying the present invention to a digital communication network, an operator is not always required to be stationed at each LO and an MT is also not necessary at each LO.

What is claimed is:

1. A remote maintenance system for a digital communication network, said system comprising:
    a toll digital switching center (TC) comprising a center digital switching network operating under No. 7, common channel signaling (CCS) system;
    a plurality of local digital switching offices (LOs) each comprising
        a local digital switching network (NW) operating said NO. 7 CCS system,
        ordinary fault detecting means for automatically detecting an ordinary fault occurring in said LO and outputting an ordinary fault signal, said ordinary fault being a fault such that said NW operates normally when said ordinary fault occurs in said LO,
        alarm controlling means for receiving said ordinary fault signal and outputting an ordinary alarm signal, said ordinary alarm signal being a signal by which occurrence of said ordinary fault in said LO is communicated, and
        serious fault detecting and repairing means for automatically detecting a serious fault occurring in said LO, automatically outputting a serious alarm signal and serious alarm data, and repairing said serious fault in accordance with first maintenance data for repairing said serious fault, said serious fault being a fault due to which said NW is failed, said serious alarm signal being a signal by which occurrence of said serious fault in said LO is communicated and said serious alarm data being data including details of said serious fault;
    digital transmission lines (DTLs) for transmitting, between each of said LOs and said TC, data and/or signals relating to ordinary communication in the digital communication network, for transmitting said ordinary alarm signal, said serious alarm signal and said serious data from said LOs to said TC, and for transmitting second maintenance data for repairing said ordinary fault and said first maintenance data from said TC to said LOs;
    a centralized maintenance and operation center (CMOC) located at said TC and operatively connected to each of said LOs through said TC and said DTLs, for remotely repairing said ordinary fault by producing and sending said second maintenance data to said LO having said ordinary fault when said ordinary alarm signal is sent from said LO to said CMOC and for remotely repairing said serious fault by producing and sending said first maintenance data to said LO having said serious fault when said serious alarm signal and said serious alarm data are sent from said serious fault detecting and repairing means of said LO to said CMOC;
    a plurality of groups of said LOs, each of said groups including at least two of said LOs; and local data lines (LDLs) operatively connected between each of said LOs in each of said groups, comprising a line for transmitting said serious alarm signal from a first LO of one of said groups to said CMOC through a second LO in the one of said groups, said serious alarm signal then being transmitted by said DTL connecting said second LO and said TC to said TC, when said serious fault occurs in said first LO and said second LO operates normally, each of said LOs further comprising data sending and receiving means for sending, under said No. 7 CCS system, said ordinary alarm signal to said CMOC and receiving said second maintenance data sent, under said No. 7 CCS system, from said CMOC, and for sending, under said No. 7 CCS system, said serious alarm signal from said first LO of one of said groups to said CMOC and receiving said first maintenance data sent, under said No. 7 CCS system, from said CMOC, respectively through said TC, said DTL connecting said second LO and said TC and said NW in said second LO, when said serious fault occurs in said first LO and said second LO operates normally.

2. A remote maintenance system according to claim 1, said system further comprising loader means for changing a route from one of said DTLs into said first LO, which corresponds to said DTL, so that said route connects said DTL to said NW in said first LO when said first LO operates normally or said ordinary fault occurs in said first LO, and said route connects said DTL to said serious fault detecting and repairing means in said first LO when said serious fault occurs in said first LO, said loader means changing said route so that said DTL is connected to said serious fault detecting and repairing means in said first LO in responseto a loader control signal sent from said second LO operating normally.

3. A remote maintenance system according to claim 2, wherein:
said alarm control means further comprising, in said second LO, a unit for outputting said loader control signal upon receiving said serious alarm signal sent from said serious fault detecting and repairing means in said first LO, when said serious fault occurs in said first LO and second LO operates normally; and
said LDL further comprising lines for sending said serious alarm signal from said serious fault detecting and repairing means in said first LO to said second LO and for sending said loader control signal from said second LO to said first LO.

4. A remote maintenance system according to claim 1, wherein:
said alarm controlling means further comprising, in said second LO, a unit for making said data sending and receiving means in said second LO send said serious alarm signal and said serious alarm data, sent from said first LO, to said CMOC, and for making said data sending and receiving means in said first LO receive said second maintenance data from said CMOC, when said serious fault occurs in said first LO and said second LO operates normally; and
said LDL further comprising lines for sending said first maintenance data received at said second LO, from said second LO to said first LO, when said serious fault occurs in said first LO and said second LO operates normally.

5. A remote maintenance system according to claim 4, said system further comprising:
data sending means, in said second LO, for sending said first maintenance data sent from said CMOC, to said serious fault detecting and repairing means in said first LO through said LDL, when said serious fault occurs in said first LO and said second LO operates normally; and
data receiving means, in said first LO, for receiving said first maintenance data sent from said data sending means in said second LO through said LDL, said first maintenance data received at said data receiving means in said first LO being fed to said serious fault detecting and repairing means in said first LO, when said serious fault occurs in said first LO and said second LO operates normally.

6. A remote maintenance system according to claim 1, said system further comprising an external supervisory equipment (ESE) for supervising switching operation of said NW, said ESE outputting a fault signal to said serious fault detecting and repairing means, said serious fault detecting and repairing means automatically outputting said serious alarm signal and said serious alarm data.

7. A remote maintenance system according to claim 2, wherein each of said LOs further comprises second data sending and receiving means, located between said serious fault detecting and repairing means and said loader means, for sending serious alarm data to said CMOC under said No. 7 CCS system through said loader means and receiving said first maintenance data sent from said CMOC under said No. 7 CCS system through said loader means.

8. A remote maintenance system according to claim 3, said system further comprising power-down alarm (PAL) means for sensing a power-down fault in said first LO of one of said groups and outputting a power-down alarm signal from said first LO to said second LO.

9. A remote maintenance system according to claim 8, wherein:
said alarm control means, in said second LO, further comprises a unit for receiving said power-down alarm signal sent from said first LO and outputting said loader control signal; and
said LDL further comprises a line for sending said power-down alarm signal from said first LO to said alarm control means in said second LO.

10. A remote maintenance system according to claim 5, said system further comprising power-down alarm (PAL) means for sensing a power-down fault in said first LO in one of said groups and outputting a power-down alarm signal from said first LO to said second LO, which is operating normally.

11. A remote maintenance system according to claim 10, wherein:
said alarm control means, in said first LO, further comprising a unit for receiving said power-down alarm signal and making said data sending and receiving means send said power-down alarm signal to said CMOC; and
said LDL further comprising a line for sending said power-down alarm signal from said firt LO to said alarm control means in said second LO.

12. A remote maintenance system for a digital communication network, said system comprising:

a toll digital switching center (TC) comprising a central digital switching network;

a plurality of local digital switching offices (LOs) divided into a plurality of groups so that each group includes at least first and second LOs, each of said LOs comprising a local digital switching network (NW) for performing a switching operation and first means for automatically outputting a serious alarm signal and serious alarm data when a serious fault occurs in said LO and for automatically repairing said serious fault by using maintenance data, said serious fault being a fault due to failure in the switching operation of said NW, said serious alarm signal being a signal by which occurrence of said serious fault in said LO is broadcast, said serious alarm data being data for detailing said serious fault and said maintenance data being data for repairing said serious fault;

a centralized maintenance and operation center (CMOC), being located at said TC, for remotely being alarmed that said serious fault has occurred in said LO by receiving said serious alarm signal from said LO and for remotely repairing said serious fault in said LO by providing and sending said maintenance data to said LO when said CMOC receives said serious alarm signal and/or data from said LO;

digital transmission line (DTL) means, connecting each of said LOS and said TC respectively, for performing ordinary communication transmission in the digital communication network and for transmitting said serious alarm signal, said serious alarm data and said maintenance data between said LO and said CMOC; and local data transmission line means for connecting said LOs in each of said groups, comprising a line for transmitting said serious alarm signal from said first LO in said group to said CMOC through said second LO or others of said LOs in said group, said DTL means connecting between said second and other LOs and said TC, when said serious fault occurs in said first LO and said second or other LOs operate normally.

13. A remote maintenance system according to claim 12, wherein each of said LOs further comprises terminal means for connecting said LO to said DTL means, second means for sending said alarm data from said first means to said CMOC through said DTL means, connecting between said first LO in said group, and said TC, avoiding said alarm data passing through said NW in said first LO when said serious fault occurs in said first LO and for leading said maintenance data received from said CMOC to said first means through said DTL means, avoiding said maintenance data passing through said NW in said first LO when said serious fault occurs in said first LO, by disconnecting said terminal means from said NW and connecting said terminal means to said first means in said first LO, said disconnecting and connecting being performed by a second means control signal received from said second LO when said second LO operates normally, and third means, in said second LO, for outputting said second means control signal to said second means in said first LO when said serious fault occurs in said first LO, said second LO operates normally and said third means in said second LO receives said alarm signal from said first means in said first LO; and said LDL means further comprises a line for transmitting said second means control signal from said third means in said second LO to said second means in said first LO when said serious fault occurs in said first Lo and said second LO operates normally.

14. A remote maintenance system according to claim 12, wherein said LOs further comprises data receiving means, in said first LO, for receiving said maintenance data sent from said CMOC through said TC, said DTL means connecting said second LO and said TC, said second LO and said LDL when said serious fault occurs in said first LO and said second LO operates normally, said maintenance data received at said data receiving means being fec to said first means in said first LO, and data sending means, in said second LO, for sending said maintenance data received from said CMOC through said TC and said DTL means, to said data receiving means in said first LO through said LDL when said serious fault occurs in said first LO and said second LO operates normally; and said LDL means further comprises a line for transmitting said maintenance data from said data sending means in said second LO to said data receiving means in said first LO when said serious fault occurs in said first LO and said second LO operates normally.

15. A remote maintenance system for a digital communication network, said system comprising:

a digital switching center comprising a central digital switching network;

a plurality of local digital switching offices divided into a plurality of groups so that each group includes at least two of said local digital switching offices, each of said local digital switching offices including a local digital switching network for providing a switching operation, alarm means for automatically outputting a serious alarm signal and serious alarm data when a serious fault occurs, and repair means for automatically repairing said serious fault using maintenance data, a centralized maintenance and operation center located at said digital switching center, said center receiving the serious alarm signal from the local digital switching office which has failed and remotely repairing the serious fault in the failed local office by producing the maintenance data based on the serious alarm data and sending the maintenance data to the failed local office;

a plurality of transmission lines, one for connecting each of said local offices to said digital switching center, for performing ordinary communication transmission in the digital communication network and for transmitting the serious alarm signal, the serious alarm data and the maintenance data between said local offices and said digital switching center; and a plurality of local data transmission means for connecting together said local offices of each of said groups.

16. A remote maintenance system according to claim 15, wherein when a local digital switching network in a first of said local offices in a first of said groups fails, said serious alarm data and the serious alarm signal are sent to said digital switching center through a first of said data transmission lines, corresponding to said first local office, via said alarm means in said first local office, and said repair means in said first local office receives said maintenance data from said digital switching center through said first data transmission line such that said failed local switching network in said first local office does not interfere with said serious alarm signal, said serious data signal or said maintenance data.

17. A remote maintenance system according to claim 15, wherein when a first of said local offices in a first of said groups incurs a failure, a second of said local offices in the first group operates normally and receives said alarm signal and said serious alarm data from said first local office via the local data transmission means connecting said first and second local offices and effects communication with said digital switching center for repairing said first local office.

18. A remote maintenance system for a digital communication network, said system comprising:
   a digital switching center comprising a central digital switching network;
   first and second local digital switching offices, each of said local digital switching offices including
   a local digital digital switching network for providing a switching operation,
   alarm means for automatically outputting a serious alarm signal and serious alarm data when a serious fault occurs, and
   repair means for automatically repairing said serious fault using maintenance data,
   a centralized maintenance and operation center located at said digital switching center, said center receiving the serious alarm signal from the local digital switching office which has failed and remotely repairing the serious fault in the failed local office by producing the maintenance data based on the serious alarm data and sending the maintenance data to the failed local office;
   first and second transmission lines for connecting said first and second local offices to said digital switching center, respectively, for performing ordinary communication transmission in the digital communication network and for transmitting the serious alarm signal, the serious alarm data and the maintenance data between said local offices and said digital switching center; and
   local data transmission means for connecting together said first and second local offices.

* * * * *

UNITED STATES PATENT AND TRADEMARK OFFICE
CERTIFICATE OF CORRECTION

PATENT NO. : 4,870,638

DATED : September 26, 1989

Page 1 of 2

INVENTOR(S) : Kawano et al.

It is certified that error appears in the above-identified patent and that said Letters Patent is hereby corrected as shown below:

```
Col. 1,    line 14, "has" should be --has been--;
           line 21, "subscribers" should be
                 --subscribers.  Therefore,--;
           line 49, "L01" should be --L0 1--;
           line 67, delete "the".
Col. 2,    line 41, delete "second,".
Col. 3,    line 6, "switching 12 network (NW)." should be
                 --switching network (NW) 12--;
           line 33, "numbers" should be --number--;
           line 56, "steps," should be --steps:--.
Col. 5,    line 33, "nemer-" should be --numer---.
Col. 6,    line 3, "re" should be --are--;
           line 11, "CMO-" should be --CMOC---;
           line 12, "Cand" should be --and--;
           line 53, "1-2, and 1-2" should be
                 --1-1 and 1-2,--.
Col. 8,    line 29, "procedures" -- should be --produces--;
           line 30, "conditions" should be --condition--;
           line 44, "down," should be --down, and--.
Col. 9,    line 58, "he" should be --the--;
           line 67, "LO" should be --LO 1-3,--.
Col. 11,   line 36, "responseto" should be --response to--;
           line 62, "first" should be --second--;
                    "second" should be --first--.
Col. 12,   line 65, "firt" should be --first--.
Col. 13,   line 29,  "LOS" should be --LOs--;
           line 35, "lines means" should be
           --lines (LDL) means--.
```

UNITED STATES PATENT AND TRADEMARK OFFICE
CERTIFICATE OF CORRECTION

PATENT NO. : 4,870,638

DATED : September 26, 1989

INVENTOR(S) : Kawano et al.

It is certified that error appears in the above-identified patent and that said Letters Patent is hereby corrected as shown below:

Col. 14, line 18, "fec" should be --fed--.

Signed and Sealed this

Eleventh Day of September, 1990

Attest:

HARRY F. MANBECK, JR.

*Attesting Officer*  *Commissioner of Patents and Trademarks*